A. D. BAKER.
GRAIN SAVING DEVICE FOR THRESHING MACHINES.
APPLICATION FILED NOV. 13, 1916.
1,296,903.
Patented Mar. 11, 1919.
2 SHEETS—SHEET 1.
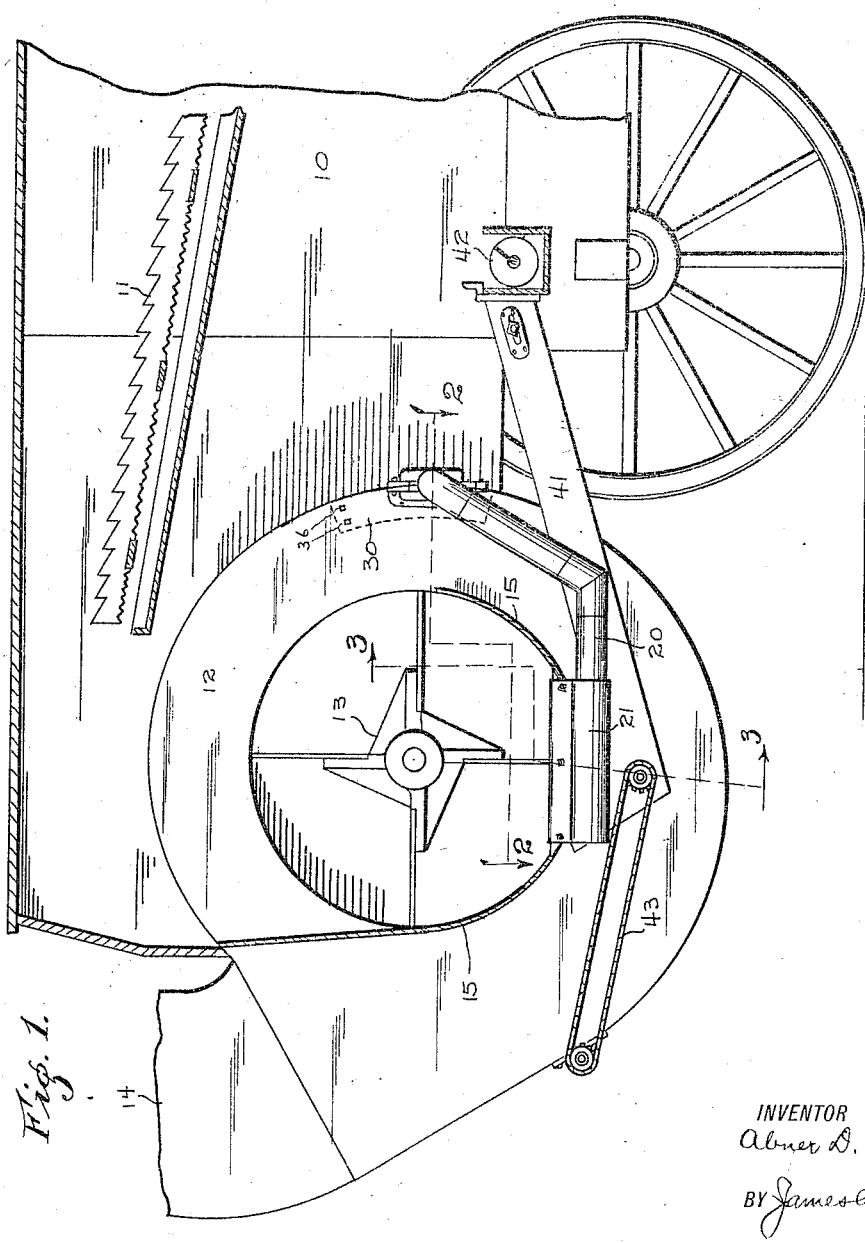

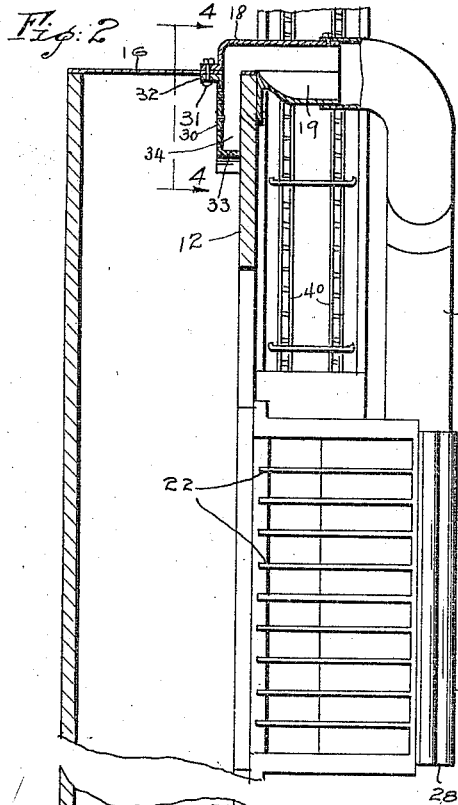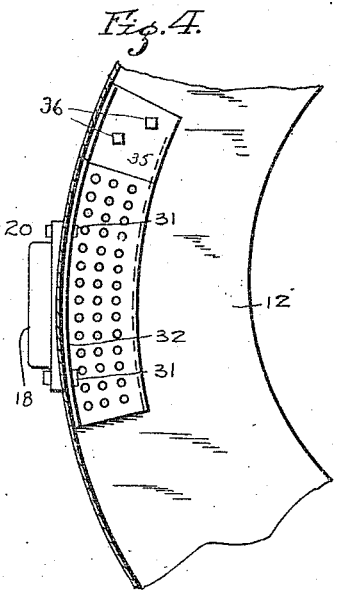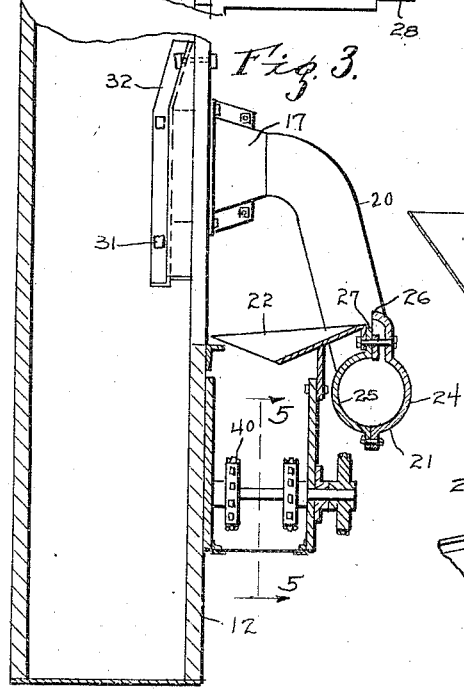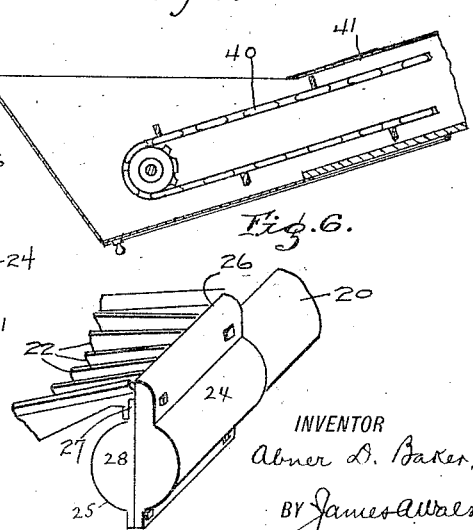

UNITED STATES PATENT OFFICE.

ABNER D. BAKER, OF SWANTON, OHIO, ASSIGNOR TO THE INDIANA MANUFACTURING COMPANY, OF INDIANAPOLIS, INDIANA, A CORPORATION OF WEST VIRGINIA.

GRAIN-SAVING DEVICE FOR THRESHING-MACHINES.

1,296,903.                     Specification of Letters Patent.     Patented Mar. 11, 1919.

Application filed November 13, 1916. Serial No. 130,963.

*To all whom it may concern:*

Be it known that I, ABNER D. BAKER, a citizen of the United States, residing at Swanton, in the county of Fulton and State of Ohio, have invented certain new and useful Improvements in Grain-Saving Devices for Threshing-Machines, of which the following is a specification.

My invention relates to improvements in grain saving devices for threshing machines of the character which is the subject of Letters Patent No. 1,175,019, issued March 14, 1916, and consists in certain details of construction and arrangements of parts whereby I am enabled to readily apply my improvements to pneumatic stackers already constructed, and obviating the necessity of specially building such stackers to include grain saving devices disclosed in said patent, as will be hereinafter more fully explained.

In the accompanying drawings, forming a part hereof, Figure 1 is a longitudinal sectional view through the rear end of a threshing machine and attached wind stacker, showing my invention in connection therewith; Fig. 2 is a detail sectional view as seen when looking downwardly from the dotted lines 2—2 in Fig. 1; Fig. 3 is a transverse sectional view looking in the direction of the arrows 3—3 in Fig. 1; Fig. 4 a detail sectional view looking in the direction of the arrows 4—4 in Fig. 2, and Figs. 5 and 6 are detail sectional views.

In said drawings, the portion marked 10 indicates a threshing machine, and 11 the straw rack therein. Attached to said machine is a pneumatic stacker of ordinary form, comprising the usual fan housing, 12, having a circular intake opening as indicated, 13 the fan therein, and 14 the ejecting chute forming part of said fan housing, the hopper 15 which communicates with the latter being shown in section.

In applying my improvement to a stacker in the field I cut away a portion of the wall, 12, and rim, 16, of the fan casing, and secure thereover a coupling or air receiver, 17, preferably composed of two sections 18, 19, (Fig. 2), the former being placed over the rim and the latter against the wall, thus forming a tubular connection for a blast pipe, 20, which leads therefrom to an air distributer, 21, adapted to discharge an air blast across the grain trap, 22. Said distributer preferably comprises two semi-cylindrical members, 24, 25, suitably bolted together, as clearly indicated in Fig. 3, the outer member 24 terminating in a curved flange, 26, extending above and slightly over flange, 27, on member 25, thus constituting an air nozzle. The end, 28, of this distributer, as will be understood, is closed, each of the members 24 and 25 being flanged, so that when assembled an imperforate wall is formed by the meeting of the two parts. While I have illustrated and described my improved air distributer as composed of two members, it will be understood, of course, that this may be a single structure made from sheet metal and a nozzle as 26 formed in any desired manner, but in practice I have found that a cast metal distributer arranged in the manner indicated may be readily applied.

On the inside of the fan casing I provide a perforated air separator, 30, which is held in position against the rim 16 together with the coupling section 18 by bolts, 31, which pass through said coupling, the rim 16 and a flange, 32, on said separator. On the side of said separator opposite to said flange 32 I provide a flange, 33, the edge of which fits snugly against the inside of wall 12, so that said perforated separator will be spaced therefrom to form an air chamber, 34. The upper end, 35, of said separator is imperforate and preferably inclined, so that it may be tightly held against the wall 12 by the bolts, 36, the lower portion of said separator being spaced from wall 12 to permit the escape of air and fine material therefrom, as it is carried around by the action of the fan blades.

Beneath the grain trap 22 I provide an endless carrier, 40, inclosed in a casing, 41, which leads to the tailings auger, 42, of the threshing machine, said carrier being operated by a suitable sprocket chain arrangement, 43, or in any other desired manner.

In operation the straw, etc., discharging from the rack 11 and other parts of the threshing machine into the stacker hopper 15, is withdrawn by the fan 13 and ejected through the chute 14 onto the straw stack as usual. The rotation of said fan compresses the air, as will be readily understood, a portion of which passes through the perforated separator 30 and through the coupling or receiver 17 into pipe 20, and fills up the air chamber 21, escaping therefrom through the nozzle formed by the flange 26 and discharges across the grain trap 22, thus winnowing material passing thereover so that loose grains and unthreshed heads become separated from the straw and chaff and fall in said grain trap from which such grain passes into the conveyer 40 and is carried thereby and discharged into the tailings auger 42, in a well known manner. By providing an air distributer of the form shown, the same may be securely placed in connection with the trap 22, and, as it becomes filled with air under pressure conveyed by pipe 20, I obtain an equal and efficient distribution through the nozzle 26 to propel and winnow the material passing from the receptacle 15 across the trap 22, so that loose and unthreshed grains will be caught therein while the straw mass passes thereover into the fan.

I claim as my invention:

1. In a grain saving device for threshing machines, a fan casing, a fan therein, a grain trap communicating with said fan casing, an air distributer communicating with said trap comprising a tubular member and a nozzle arranged longitudinally thereof for discharging air across said trap, means for attaching said distributer to said trap, a blast pipe leading from said fan casing to said distributer, and means for removably attaching said pipe to said fan casing.

2. In a grain saving device for threshing machines, a fan casing having an opening in its periphery, an air receiver positioned over said opening, a blast pipe detachably secured to said receiver, and an air distributer detachably secured to the opposite end of said pipe for receiving and discharging air conveyed from said fan casing into said distributer.

3. In a grain saving device for threshing machines, a fan casing having an opening in its periphery, an air separator comprising a flanged perforated member detachably positioned over said opening, an air distributer comprising a tubular body and a discharging nozzle arranged longitudinally thereof, and a blast pipe leading from said opening to said distributer for receiving and discharging air from said fan casing into said distributer, said blast pipe being removably attachable to said casing.

4. In a grain saving device for threshing machines, a fan casing having an opening in its periphery, an air separator positioned inside said casing over said opening, a blast pipe detachably secured outside of said casing over said opening, and an air distributer communicating with said blast pipe and detachably secured thereto, said distributer having a tubular member closed at one end and means arranged longitudinally of said member for distributing air.

5. In a grain saving device adapted for application to a threshing machine already constructed, the combination of a fan casing having an opening in its periphery, a separator within said casing adjacent said opening, a blast pipe detachably secured to said casing, and an air distributer detachably secured to said pipe comprising a cylindrical body closed at its outer end and opened longitudinally along its side, and having means for distributing air discharging through said opening.

6. In a threshing machine, the combination of a fan casing having an opening therein, a blast pipe detachably secured over said opening, and a cylindrically shaped air distributer communicating with the outer end of said pipe, said distributer having means arranged longitudinally therein for controlling and distributing air discharging through said pipe into said cylinder.

In testimony whereof I affix my signature in the presence of two witnesses.

ABNER D. BAKER.

Witnesses:
C. W. CRISMAN,
J. A. WALSH.

Copies of this patent may be obtained for five cents each, by addressing the "Commissioner of Patents, Washington, D. C."